US012712407B2

(12) United States Patent
Wang et al.

(10) Patent No.: US 12,712,407 B2
(45) Date of Patent: Aug. 18, 2026

(54) HIGH CONDUCTIVE BUSBARS WITH ULTRA-CONDUCTING COMPOSITE OF CARBON NANO-TUBES FOR ELECTRIC MACHINES

(71) Applicant: GM Global Technology Operations LLC, Detroit, MI (US)

(72) Inventors: Qigui Wang, Rochester Hills, MI (US); Yi Liu, Troy, MI (US); Kestutis A. Sonta, Troy, MI (US); Vang N. Kue, Macomb, MI (US); Akshay Trivedi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 407 days.

(21) Appl. No.: 18/504,633

(22) Filed: Nov. 8, 2023

(65) Prior Publication Data

US 2025/0149946 A1 May 8, 2025

(51) Int. Cl.
*H02K 3/50* (2006.01)
*B32B 15/04* (2006.01)
(Continued)

(52) U.S. Cl.
CPC ............ *H02K 3/50* (2013.01); *B32B 15/043* (2013.01); *B32B 15/18* (2013.01); *B32B 15/20* (2013.01); *B32B 37/06* (2013.01); *B32B 37/10* (2013.01); *H02K 15/32* (2025.01); *B32B 2255/06* (2013.01); *B32B 2255/205* (2013.01); *B32B 2255/28* (2013.01); *B32B 2307/202* (2013.01); *B32B 2311/12* (2013.01); *B32B 2311/24* (2013.01); *B32B 2311/30* (2013.01);
(Continued)

(58) Field of Classification Search
CPC . C08K 3/04; H01B 13/00; H01B 1/04; H01B 11/1808; H01B 1/026; H01B 7/0009
See application file for complete search history.

(56) References Cited

U.S. PATENT DOCUMENTS 8,853,540 B2 * 10/2014 Adriaenssens ........... C08K 3/04
174/126.2
2016/0118157 A1 * 4/2016 Holesinger ............. B32B 15/20
72/274
(Continued)

FOREIGN PATENT DOCUMENTS

WO 2018064137 A1 4/2018

OTHER PUBLICATIONS

Wang, Q., et al. U.S. Appl. No. 18/161,496, filed Jan. 30, 2023.
(Continued)

*Primary Examiner* — Leda T Pham
(74) *Attorney, Agent, or Firm* — Vivacqua Crane, PLLC

(57) ABSTRACT

A composite conductor for a vehicle, a propulsion system for a vehicle, and a method of forming a composite busbar for a vehicle. The composite conductor includes a surface, and a first copper tape laminated to the surface. The composite conductor is electrically conductive exhibiting an electrical conductivity of $1.0\times10^7$ Siemens per meter (S/m) or greater. The first copper tape includes a layer of carbon nanotubes
(Continued)

sandwiched between a first copper layer and a second copper layer. The composite busbar may be connected to a plurality of windings in the stator of an electric motor.

20 Claims, 5 Drawing Sheets

(51) Int. Cl.

| | |
|---|---|
| ***B32B 15/18*** | (2006.01) |
| ***B32B 15/20*** | (2006.01) |
| ***B32B 37/06*** | (2006.01) |
| ***B32B 37/10*** | (2006.01) |
| ***H02K 15/32*** | (2025.01) |

(52) U.S. Cl.
CPC ....... *B32B 2313/04* (2013.01); *B32B 2457/00* (2013.01); *H02K 2203/09* (2013.01)

(56) References Cited

U.S. PATENT DOCUMENTS

2020/0294648 A1 9/2020 Ruff et al.
2023/0208237 A1* 6/2023 Gopalakrishnan ....... H02K 3/50 310/71

OTHER PUBLICATIONS

Wang, Q., et al. U.S. Appl. No. 18/174,879, filed Feb. 27, 2023.
Li et al. Copper-Carbon Nanotube Composites Enabled by Electrospinning for Advanced Conductors, ACS Applied Nano Materials, Jul. 24, 2020, pp. 6863 to 6875, vol. 3, Issue 7, American Chemical Society, United States.
New composite material revs up pursuit of advanced electric vehicles, Sep. 21, 2020, Oak Ridge National Laboratory, https://www.ornl.gov/news/new-composite-material-revs-pursuit-advanced-electric-vehicles#:~:text=Scientists%20at%20Oak%20Ridge%20National,dense%20electric%20vehicle%20traction%20motors. Accessed Nov. 8, 2023.
Ultra-Conducting Copper (UCC) (Keystone Project #2), Jun. 11, 2019, Oak Ridge National Laboratory, https://www.energy.gov/eere/vehicles/articles/ultraconducting-copper, accessed Nov. 8, 2023.
Ultra-Conducting Copper (UCC), Jun. 19, 2018, Oak Ridge National Laboratory, https://www.energy.gov/eere/vehicles/articles/vehicle-technologies-office-merit-review-2018-ultraconducting-copper, accessed Nov. 8, 2023.
United States Patent and Trademark Office. U.S. Appl. No. 18/161,496, filed Jan. 30, 2023.
United States Patent and Trademark Office. U.S. Appl. No. 18/174,879, filed Feb. 27, 2023.

* cited by examiner

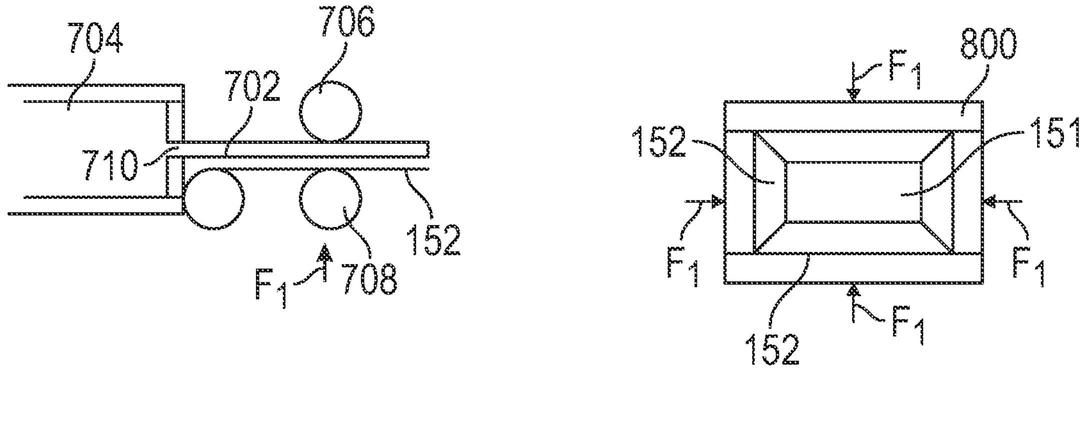
FIG. 7
FIG. 8
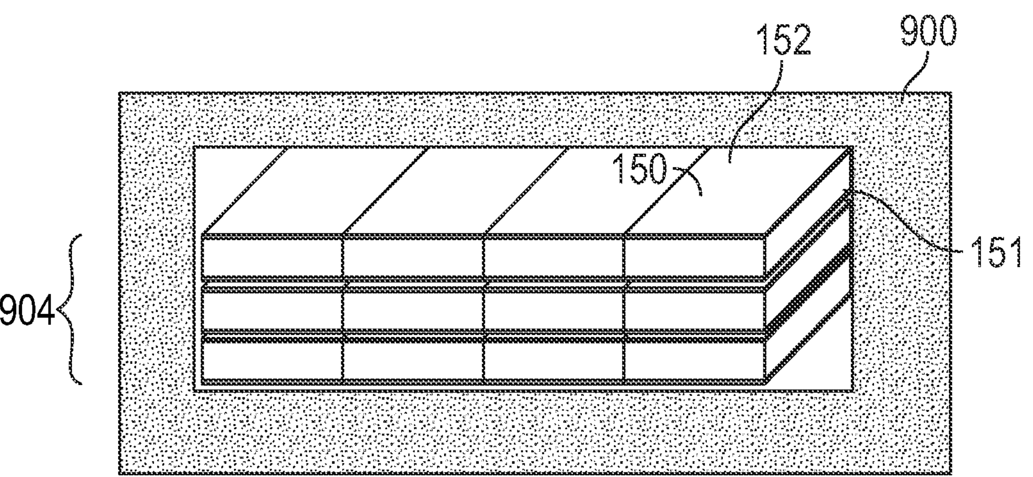
FIG. 9

HIGH CONDUCTIVE BUSBARS WITH ULTRA-CONDUCTING COMPOSITE OF CARBON NANO-TUBES FOR ELECTRIC MACHINES

INTRODUCTION

Electric and hybrid electric vehicle technology has been enabled by the development and deployment of rechargeable, secondary batteries which provide energy to electric traction motors, servo motors, and other electronics in the vehicle. Busbars are used to establish switching connections between windings in the motors and connect the windings to phase connectors, which are connected to power electronics. Busbars may be fabricated in a variety of shapes of flat or hollow form and from a number of materials such as iron, steel, copper, aluminum, bronze, silver, or gold. The material composition and cross-section of a busbar determine the maximum carriable current. In addition, the connections between the busbars and windings or other components may cause heating effects.

Traction motors utilize alternating electric current (AC). However, in alternating electric current (AC) power distribution, current density tends to be larger near the surface of the busbar and decreases as it approaches the core. This effectively decreases the cross-section of the busbars and increases effective resistance. This effect, known as the skin effect, increases as the frequency of the alternating current increases. To combat this effect, a single busbar may be replaced by a number of smaller current carrying composite conductors or busbars.

Thus, while present traction motor busbars achieve their intended purpose, there is a need for new and improved traction motor busbars.

SUMMARY

According to several aspects, the present disclosure relates to a composite conductor for a vehicle. The composite conductor includes a surface, and a first copper tape laminated to the surface. The composite conductor is electrically conductive exhibiting an electrical conductivity $1.0\times 10^{7}$ Siemens per meter (S/m) or greater. The first copper tape includes a layer of carbon nanotubes sandwiched between a first copper layer and a second copper layer.

According to embodiments of the above the first copper layer comprises a copper foil and the second copper layer comprises a copper coating.

According to any of the above embodiments, the first copper tape exhibits a thickness in the range of 10 micrometers to 40 micrometers.

According to any of the above embodiments, the carbon nanotube layer exhibits a thickness in the range of 2 nanometers to 50 nanometers, including all values and ranges therein, the copper coating layers exhibits a thickness in the range of 0.1 to 3 micrometers.

According to any of the above embodiments, the composite conductor is formed from one or more of the following materials selected from the group consisting of copper, aluminum, and iron.

According to any of the above embodiments, the composite conductor also includes at least one additional carbon nanotube layer disposed on the second copper layer and at least one additional second copper layer disposed on the at least one additional carbon nanotube layer.

According to any of the above embodiments, at least one additional copper tape is bonded to the first copper tape bonded to the surface.

According to any of the above embodiments, no intermetallic phases are formed at the surface.

According to any of the above embodiments, a plurality of composite conductors are sintered together.

According to any of the above embodiments, the composite conductor is in the form of a busbar. In further embodiments, the busbar is affixed to a plurality of windings of a stator. In yet further embodiment, a rotor is rotatably held in the stator. And in yet further embodiments, the busbar is affixed to an inverter.

According to several additional aspects, the present disclosure relates to a propulsion system for a vehicle. The propulsion system includes an electric motor. The electric motor includes a stator including a plurality of windings, a rotor arranged within the stator, and a composite busbar connected to the plurality of windings. The composite busbar includes a busbar including a surface, the busbar formed of at least one material selected from the group consisting of copper, aluminum, and iron. The composite busbar also includes a first copper tape laminated to the surface. The first copper tape includes a layer of carbon nanotubes sandwiched between a first copper foil layer and a second copper coating layer. In addition, the first copper tape exhibits a thickness in the range of 10 micrometers to 40 micrometers. Further, the carbon nanotube layer exhibits a thickness in the range of 2 nanometers to 50 nanometers, including all values and ranges therein, and the copper coating layers exhibits a thickness in the range of 0.1 to 3 micrometers.

In any of the above embodiments, at least one additional carbon nanotube layer is disposed on the second copper layer and at least one additional second copper layer is disposed on the at least one additional carbon nanotube layer.

In any of the above embodiments, at least one additional copper tape is laminated to the first copper tape bonded to the surface.

According to several additional aspects, the present disclosure relates to a method of forming a composite busbar for a vehicle. The method includes heating a busbar and a first copper tape. The first copper tape includes a layer of carbon nanotubes sandwiched between a first copper layer and a second copper layer. The method further includes laminating the first copper tape to the busbar by applying a force to the busbar and the first copper tape and bonding the first copper tape to a surface of the busbar. The method yet further includes heat treating the busbar and first copper tape.

According to embodiments of the above, laminating includes thermal rolling of the first copper tape to the surface, wherein the first copper tape exhibits a first length before drawing and a second length in the range of 100 percent to less than 105 percent of the first length. Alternative, or additionally, laminating includes extrusion onto the first copper tape, wherein the first copper tape exhibits a first length before drawing and a second length in the range of 100 percent to less than 105 percent of the first length. In further alternative embodiments of the above, laminating includes hot-isostatic-pressing of the first copper tape to the surface of the busbar.

BRIEF DESCRIPTION OF DRAWINGS

The drawings described herein are for illustration purposes only and are not intended to limit the scope of the present disclosure in any way.

FIG. 7 illustrates an alternate schematic of a laminating process according to various embodiments of the present disclosure.

FIG. 8 illustrates a yet another alternate schematic of a laminating process according to various embodiments of the present disclosure; and FIG. 9 illustrates a busbar array in a process chamber according to various embodiments of the present disclosure.

DETAILED DESCRIPTION

Figure 1:
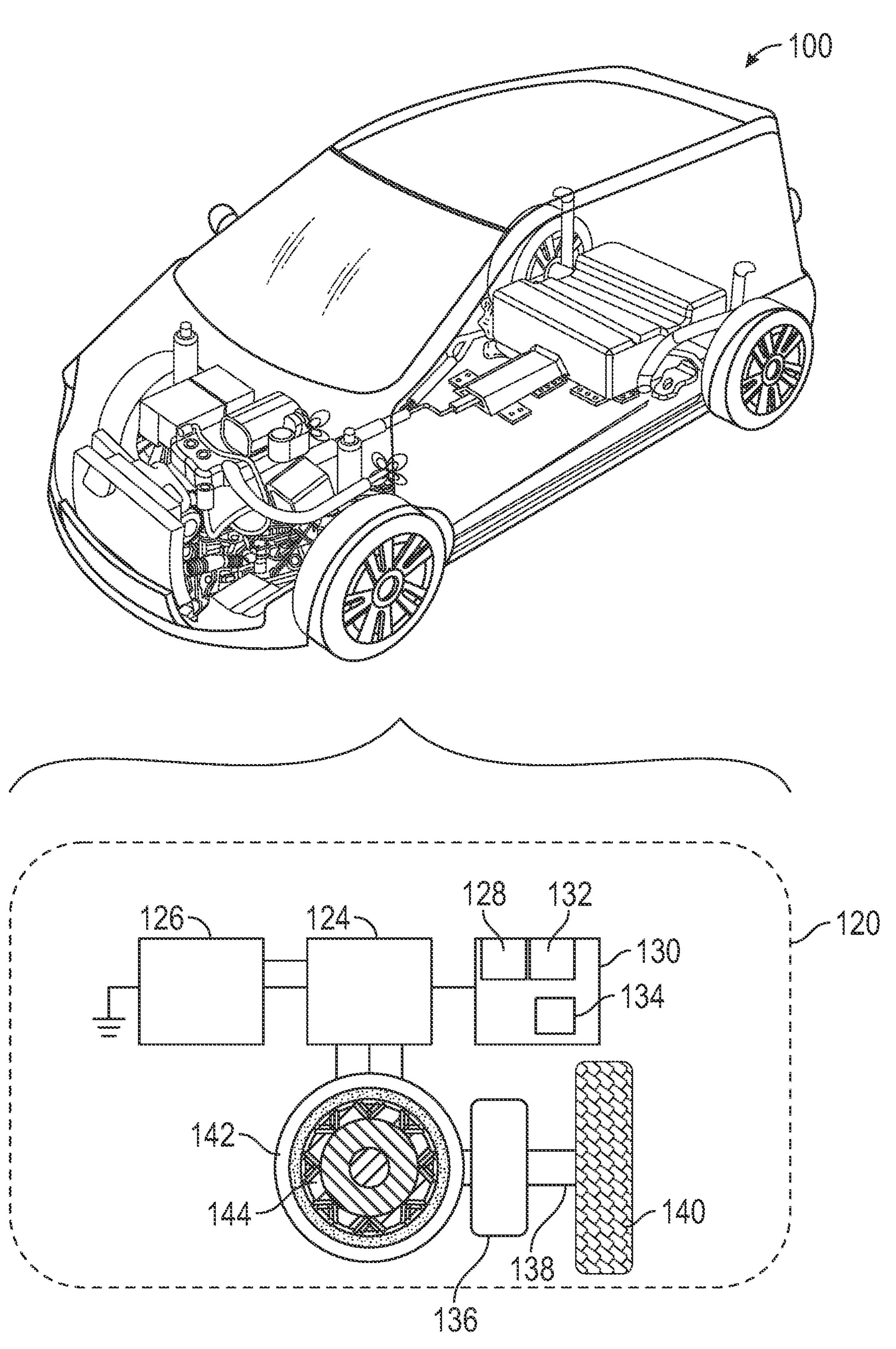
FIG. 1 illustrates a vehicle including a propulsion system utilizing an electric traction motor according to various embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure is related to a composite conductor for a vehicle including copper tape applied to the surfaces of the composite conductor. The composite conductor is, in embodiments, a composite busbar for connecting the windings of an electric motor in a vehicle to the battery or other components in a power electronics module, such as an inverter. In addition, the present disclosure relates to a propulsion system for a vehicle including the composite busbar. The present disclosure further relates to a method of forming a composite busbar conductor.

As used herein, the term "vehicle" is not limited to automobiles. While the present technology is described primarily herein in connection with electric vehicles, the technology is not limited to electric vehicles, but hybrid electric vehicles as well. In addition, the concepts can be used in a wide variety of applications, such as in connection with components used in motorcycles, mopeds, locomotives, aircraft, marine craft, and other vehicles, as well as in other applications utilizing batteries, such as in portable power stations, such as those used for powering remote job sites, emergency back-up power supplies, and permanent power stations associated with buildings and equipment, all of which may be powered by, for example, solar or wind-powered generator systems, power mains, and fuel based power generators such as gasoline or diesel generators as well as sterling engines.

FIG. 1 illustrates a vehicle 100 including a propulsion system 120. The propulsion system 120 generally includes an electric motor 124 and a secondary battery 126 for powering the electric motor 124. Further, in many embodiments of the propulsion system 120, the propulsion system 120 includes an inverter 128 for changing power from DC (direct current) as provided by the battery 126 to AC (alternating current) as it is used by the electric motor 124. The inverter 128 may be included in a power electronics module 130, which includes e.g., transistors and diodes, for switching the power from DC to AC and vice-versa. In embodiments, the battery is connected to the electric motor through the power electronics module.

A controller 132 is connected to the inverter 128 and is programmed to control and manage the operations of the electric motor 124 and associated hardware, including the inverter 128. The electric motor 124 is connected to a transmission (drive unit) 136, and drive line 138, which transfers mechanical power and rotation to the wheels 140 of the vehicle 100. The controller 132 includes one or more one or more processors and tangible, non-transitory memory 134.

With reference again to the electric motor 124, the electric motor 124, powered by the battery 126, includes a stator 142 and a rotor 144 arranged in a rotatable manner within the stator 142. The stator 142 is the stationary part of the electric motor 124. The stator 142 provides a rotating magnetic field with which the stationary magnetic field of the rotor 144 tries to align with, causing the rotor 144 to rotate, in what may be referred to as "motoring" mode. In traction electric vehicle applications, the motoring mode provides propulsion to the vehicle 100. In other applications, the rotor's 144 rotating field (as caused by physical rotation) generates an electric current in the stator 142—this mode of operation is referred to as "generation" and the electric motor 124 used in this way is used as a generator. Generation mode takes some of the energy recovered from braking, e.g., when the vehicle is in the process of slowing and stopping and stores it back in the battery 126.

Figure 2A:
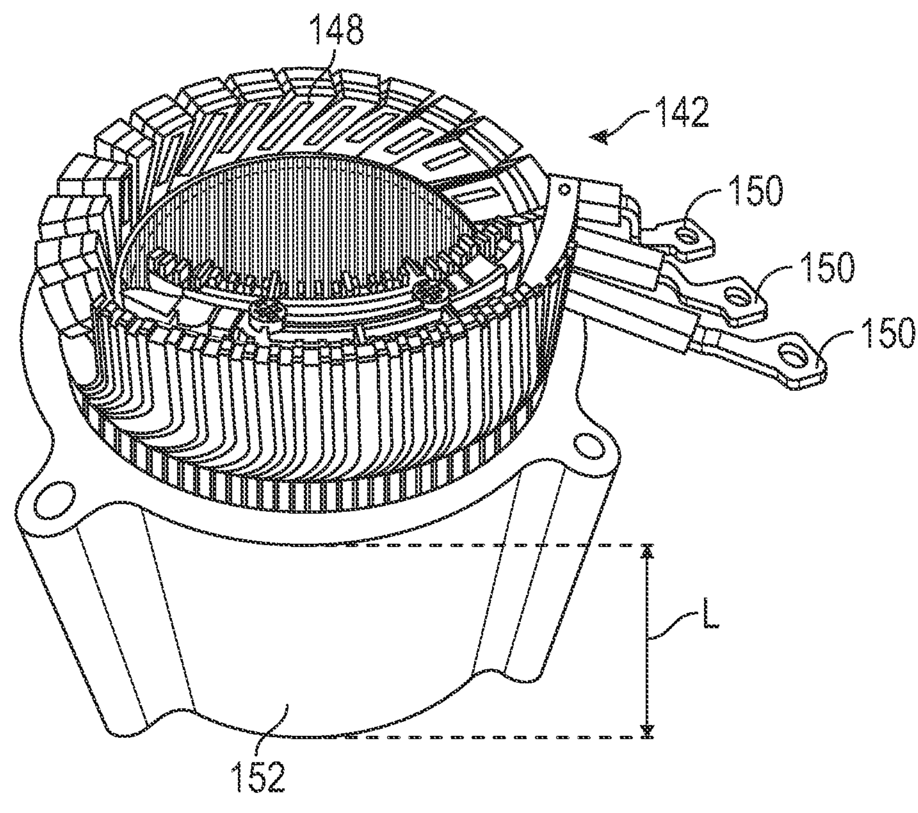
FIG. 2A illustrates a traction motor stator according to various embodiments of the present disclosure.
Figure 2B:
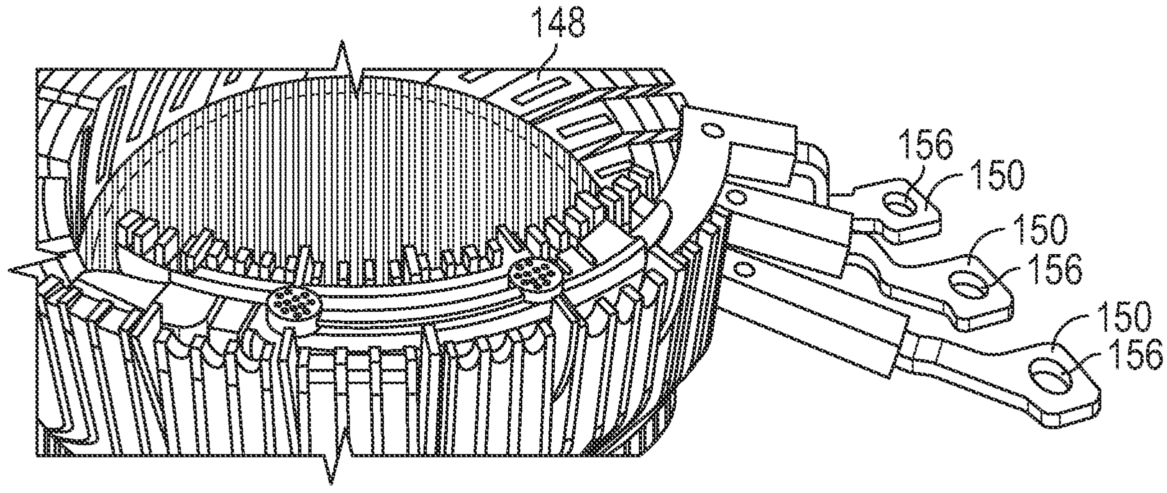
FIG. 2B illustrates a close-up view of the traction motor stator according to various embodiments of the present disclosure.

Reference is made to FIGS. 2A and 2B illustrating an example of stator 142. The stator 142 may generally include a plurality of wire windings 148 extending the length L of the stator 142. The wire windings 148 may be formed of, for example, copper, or another conductive material. The wire windings 148 are connected to one or more composite busbars 150, which connect the wire windings 148 to inverter 128 in the power electronics module 130 and battery 126.

Figure 3A:
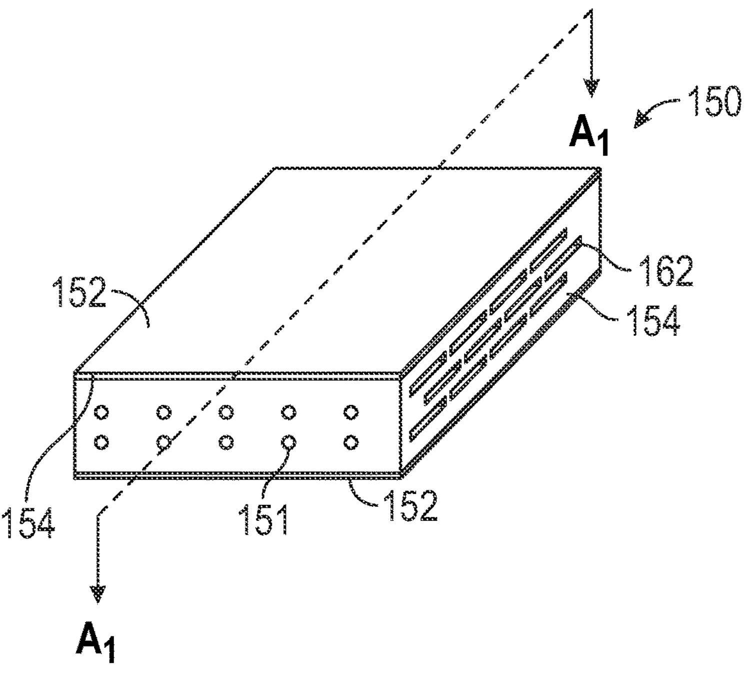
FIG. 3A illustrates a cross-sectional view of a composite busbar according to various embodiments of the present disclosure.

As illustrated in FIG. 3A, the composite busbars 150 are formed from composite conductors including an electrically conductive busbar 151 and electrically conductive copper tape 152. Electrically conductive may be understood herein as measure of a material's ability to carry an electrical current and an electrically conductive material used herein exhibits an electrical conductivity of $1.0\times10\hat{7}$ Siemens per meter (S/m) or greater at 20 degrees Celsius, including all values and ranges from $1.0\times10\hat{7}$ S/m to $6.4\times10\hat{}7$ S/m. In embodiments, the electrically conductive material of the busbar 151 includes a metal or metal alloy, including one or more of copper, aluminum, iron, and alloys thereof.

The copper tape 152 includes a layer of aligned carbon nanotubes 162 and is laminated to one or more surfaces 154 of a busbar 151. The copper tape 152 exhibits an electrical conductivity that is greater than the electrical conductivity of the busbar 151 or other conductor. In embodiments, the electrical conductivity is in the range of $5.5\times10^7$ S/m to $6.0\times10^7$ S/m at 20 degrees Celsius including all values and ranges therein such as $5.80\times10^7$ S/m to $5.96\times10^7$ S/m. In additional or alternative embodiments, the electrical conductivity is in the range of 101 percent to 500 percent of IACS, including all values and ranges therein. In embodiments, the copper tape 152 may be positioned on all the surfaces 154 of the busbar 151, including on the surfaces in the openings 156 defined by the busbar 151 (see FIG. 2B). In additional embodiments, more than one layer of copper tape 152 is applied to surfaces 154 of the busbar 151, such as in the range of two layers to 10 layers including all values and ranges therein.

Figure 3B:
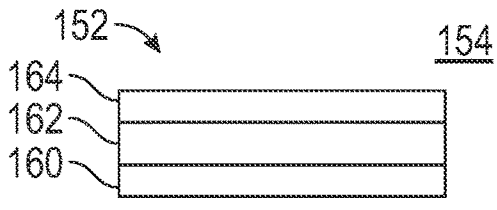
FIG. 3B illustrates a cross-sectional view of copper tape according to various embodiments of the present disclosure.

FIG. 3B illustrates an embodiment of the copper tape 152. As seen in the figure, the copper tape 152 includes a first layer of copper foil 160. A first coating layer of carbon nanotubes 162 is deposited on copper foil layer 160. The carbon nanotubes include single wall nanotubes, or, in alternative embodiments, may include multiwall nanotubes. Further, the carbon nanotubes may be doped with copper at a level in the range of 0.1 volume percent to 50.0 volume percent of the total volume percent of the nanotubes, including all values and ranges therein. The carbon nanotubes 162 are generally aligned along their longitudinal axis A1 with the length of the tape, also aligned along A1. It should be appreciated, that depending on the application, there may be embodiments where the alignment of the longitudinal axis A1 of the carbon nanotubes 162 depart from the longitudinal axis of the copper tape 152. A second coating layer of copper 164 is deposited on the carbon nanotubes 162, sandwiching the carbon nanotubes 162 between the two copper layers 160, 164. In further embodiments, the copper tape 152 may include additional carbon nanotube coating layers 162 sandwiched between additional copper coating layers 164.

The copper tape 152 exhibits a thickness in the range of 10 to 40 micrometers, including all values and ranges therein. In embodiments, the carbon nanotube layer 162 exhibits a thickness in the range of 2 nanometers to 50 nanometers, including all values and ranges therein, the copper coating layers 164 exhibits a thickness in the range of 0.1 to 3 micrometers, including all values and ranges therein, and the copper film 160 is exhibits a thickness sufficient to provide the 10 micrometer to 40 micrometer thickness of the copper tape 152, including all values and ranges therein.

Figure 4:
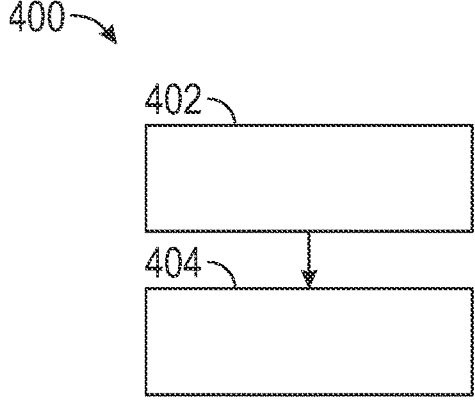
FIG. 4 illustrates a method of forming a conductive tape according to various embodiments of the present disclosure.

In embodiments, as illustrated in the method 400 of FIG. 4 and with reference to FIGS. 3A and 3B, the copper tape 152 may be formed by depositing a layer of carbon nanotubes in a dispersion at block 402 on top of a copper foil 160. The dispersion of the carbon nanotubes (CNT's) may include carbon nanotubes dispersed in a solvent exhibiting a boiling point above 100 degrees Celsius at standard atmospheric pressure, such a dimethylformamide (DMF) or n-methyl-2-pyrrolidone. The dispersion may also include a binder such as polyvinyl pyrrolidone. The carbon nanotube dispersion may be deposited by a process such as electrospinning, electro-spraying, or by an air blade. After the solvent has evaporated, the copper coating 164 (Cu coating) is then deposited onto the carbon nanotube layer 162 at block 404. If multiple layers of carbon nanotubes and copper coatings are present, then the method 400 may be repeated depositing a layer of carbon nanotubes over the previously deposited copper coating layer.

Figure 5:
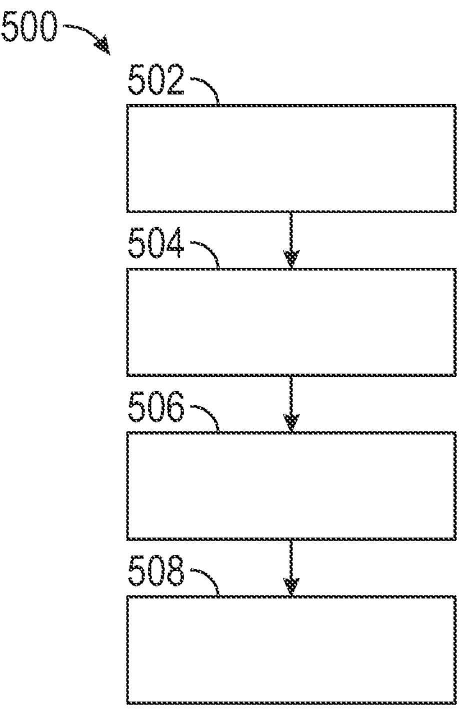
FIG. 5 illustrates a method of forming a conductive composite busbar according to various embodiments of the present disclosure.

Reference is now made to FIG. 5, which illustrates, with further reference to FIGS. 3A and 3B, a method 500 of forming a composite conductor, such as a composite busbar 150, including copper tape 152 laminated to a busbar 151. At block 502 the copper tape 152 and busbar 151 may be heated at a temperature in the range of 50 degrees Celsius to 300 degrees Celsius, including all values and ranges therein such as in the range of 100 degrees Celsius to 200 degrees Celsius, below the solidus temperature of the copper, for a time period in the range of a thirty minutes to 240 minutes, including all values and ranges therein. The solidus temperature is understood herein as the temperature at which the metal or metal alloy begins to melt or turn to liquid. For example, the solidus temperature of cast iron is in the range of 1141 degrees Celsius to 1157 degrees Celsius at standard pressure (101.325 kilopascals) and in the range of 1535 degrees Celsius to 1545 degrees Celsius at standard pressure for iron. After heating, or while heating, at block 504, a force is applied to the busbar 151 and copper tape 152 to thermally bond and laminate the copper tape 152 to the busbar 151.

Optionally, at block 506 a strain is applied bonded to a surface 154 of the busbar 151. If a strain is present, the copper tape 152 may be under a strain of up to 5 percent of the total initial length of the copper tape 152. That is, in embodiments, the copper tape 152 may be elongated by up to 5 percent of the total initial length of the copper tape 152, including all values and ranges from 0.01 percent to 5 percent of the total length of the tape. Strain is understood herein as the change in length, i.e., the difference between final length and the original length, divided by the original length.

Thermal bonding and lamination may be performed by a number of processes including, for example, at least one of thermal rolling, extrusion, and hot-static-pressing discussed further below. The processes herein may all occur at atmospheric pressures in air or an inert atmosphere as well as, in some instances, under vacuum. Inert atmospheres may include, for example, argon or nitrogen gas.

Figure 6:
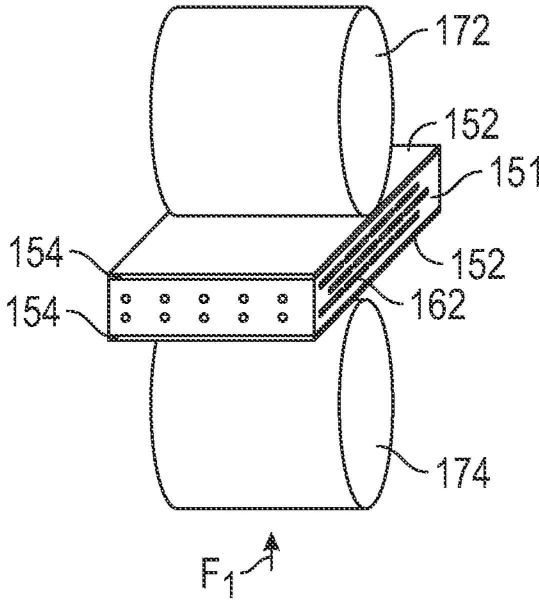
FIG. 6 illustrates a schematic of a laminating process according to various embodiments of the present disclosure.

Thermal rolling, an embodiment of which is illustrated in FIG. 6, includes a process of rolling the busbar 151 or other composite conductor, with copper tape 152 disposed on one or more surface 154, between two rotating rolls 172, 174 that apply a force F1 against the busbar 151 and copper tape 152. In embodiments, the force F1 applied is in the range of 0.5 times to 0.9 times the yield strength of the material of the busbar at a given temperature. The force F1 used for, for example, copper or iron may be in the range of 100 megapascals (MPa) to 120 MPa, including all values and ranges therein, and the force F1 used for, for example, aluminum may be in the range of 20 MPa to 30 MPa, including all values and ranges therein. In some embodiments, the force F1 is about 10 to 20 percent of the yield strength of pure copper at room temperature, in the range of about 200 to 250 megapascals, including all values and ranges therein.

In an alternative or additional embodiment, an example of which is illustrated in FIG. 7, for conductive materials such as aluminum, iron, steel, copper, or magnesium, an extrusion process may be utilized where the material is extruded into an extrudate 702 having a desired shape from an extruder 704, and the copper tape 152 is applied to the extrudate 702 after exiting the die 710 of the extruder 704. During the extrusion process, the conductive material may be heated at a temperature in the range of 50 degrees Celsius to 300 degrees Celsius, including all values and ranges therein such as in the range of 100 degrees Celsius to 200 degrees Celsius, below the solidus temperature of the busbar, for a time period in the range of a thirty minutes to 240 minutes, including all values and ranges therein, such as at a temperature in 300 degrees Celsius to 500 degrees Celsius, or 900 degrees Celsius to 950 degrees Celsius, including all values and ranges therein. Force F1 may be applied to the extrudate 702 and the copper tape 152 by rollers 706, 708. In embodiments, the force F1 applied is in the range of 0.5 times to 0.9 times the yield strength of the material of the busbar at a given temperature. In embodiments, where aluminum is extruded, for example, the force may be in the range of 20 MPa to 30 MPa, including all values and ranges therein.

In yet a further embodiment, a hot-isostatic-pressing (HIP) process or hot pressing may be used to sinter the copper tape 152 to the busbar 151. During the hot-isostatic process, an example of which is illustrated in FIG. 8, a mold 800 may be used to apply a force F1 around the busbar 151 and the copper tape 152, which is illustrated as being provided on all sides of the busbar 151. For copper and iron, the busbar 151 and copper tape 152 is heated at a temperature in the range of, for example, 800 degrees Celsius to 900 degrees Celsius, including all values and ranges therein. Further, a pressure is applied in the range of 100 MPa to 120 MPa, including all values and ranges therein, and pressure is held for a half hour or longer, such as in the range of 30 minutes to 240 minutes, including all values and ranges therein. For aluminum the busbar 151 and copper tape 152 is heated at a temperature in the range of, for example, 150 degrees Celsius to 250 degrees Celsius, including all values and ranges therein. Further, a pressure is applied in the range of 20 MPa to 30 MPa, including all values and ranges therein, and pressure is held for a half hour or longer, such as in the range of 30 minutes to 240 minutes, including all values and ranges therein After thermal bonding, the laminated copper tape 152 and busbar 151, i.e., the composite busbar 150, may undergo additional heat treatment at block 508. As illustrated in FIG. 9, the composite busbars 150 are placed in a process chamber 900. In embodiments, the process chamber 900 may be an oven or an oil bath. For example, in embodiments, the composite busbar 150 may be quenched, and cooled at a rate sufficient to prevent reduction in the applied strain or to provide stress relief. Heat treatment for aluminum busbars including the laminated copper tape includes, for example, heating the aluminum busbars including the laminated copper tape at a temperature in the range of 200 degrees Celsius to 300 degrees Celsius, including all values and ranges therein, for a period of 1 hour to 3 hours, including all values and ranges therein. Heat treatment for copper busbars including the laminated copper tape includes, for example, heating the copper busbars including the laminated copper tape at a temperature in the range of 400 degrees Celsius to 600 degrees Celsius, including all values and ranges therein, for a period of 1 hour to 3 hours, including all values and ranges therein.

In additional, or alternative embodiments of the above, the copper tape 152 is applied during the process of forming the busbar 151, such as stamping busbars 151 from sheet stock. For example, the copper tape 152 may be placed on the busbar 151 feedstock and stamped with the busbar 151. Alternatively, during or after performing the laminating processes noted above, the copper tape 152 may be shaped and trimmed, such as by die cutting, to match the dimensions of the busbar 151. For example, the copper tape 152 may be provided over the busbar 151 and span the openings 156 that may be defined in the busbar 151. After laminating the copper tape 152 to the busbar 151, copper tape 152 at the opening 156 may be removed to provide access to the opening 156 defined in the busbar 151.

Further, in embodiments, complete metallurgical bonds are formed between the copper foil layer 160 of the copper tape 152 and the busbar 151. That is, at least 99 percent, and up to 100 percent, of the interface between the copper tape 152 and surface 154 of the busbar 151 is metallurgically bonded together. In addition, in embodiments, no intermetallic phases are present, which is facilitated, in embodiments, by performing the processes above in an inert environment, including within a process chamber under vacuum. In alternative embodiments, the processes may occur in a reactive atmosphere to provide desired inter-metallics at the interface between the copper tape 152 and the busbar 151.

While the composite conductors are described in terms of the composite busbars 150 used herein, the composite conductors may alternatively include, in embodiments, wires, cables, hollow tubes, or plates formed from one or more conductive materials, such as aluminum, copper or iron. In addition, in embodiments, composite conductors forming busbars may assume any number of geometries and not just those specified and illustrated herein. Further, in embodiments, a plurality of composite conductors are sintered together forming an array 904 of composite conductors, illustrated in FIG. 9.

The methods and systems herein offer a number of advantages. These advantages include, for example, at least a five percent reduction in electrical resistance, at least a ten percent increase in ampacity, and at least a ten percent improvement in strength as compared to, e.g., pure copper. Advantages also include enhancement of the "skin" effect with the addition of the copper tape, improving performance in relatively high frequency applications, such as electric motors running at 10,000 rotations per minute or greater, with a frequency of greater than 1,000 Hertz, as well as enhance overall conductivity in low speed applications, such as electric, induction type, motors running at less than 10,000 rotations per minutes or less, with a frequency of less than 1,000 Hertz, to improve system drive cycle efficiency. Yet another advantage includes an increase in power density. Further advantages include the ability to apply tape where coatings may be difficult to apply.

As used herein, the term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The controller 132 may also consist of multiple controllers which are in electrical communication with each other. The controller 132 may be inter-connected with additional systems and/or controllers of the vehicle 100, allowing the controller 132 to access data such as, for example, speed, acceleration, braking, and steering angle of the vehicle 100.

A processor may be a custom made or commercially available processor, a central processing unit (CPU), a graphics processing unit (GPU), an auxiliary processor among several processors associated with the controller 132, a semi composite conductor-based microprocessor (in the form of a microchip or chip set), a macroprocessor, a combination thereof, or generally a device for executing instructions.

The tangible, non-transitory memory 134 may include volatile and nonvolatile storage in read-only memory (ROM), random-access memory (RAM), and keep-alive memory (KAM), for example. KAM is a persistent or non-volatile memory that may be used to store various operating variables while the processor is powered down. The tangible, non-transitory memory 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 132 to control various systems of the vehicle 100.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A composite conductor for a vehicle, comprising:

a conductor including a surface, wherein the conductor is electrically conductive exhibiting an electrical conductivity of $1.0\times10^7$ Siemens per meter (S/m) or greater; and a first copper tape laminated to the surface, wherein the first copper tape includes a layer of carbon nanotubes sandwiched between a first copper layer and a second copper layer, wherein the first copper layer comprises a copper foil and the second copper layer comprises a copper coating, wherein the first copper tape exhibits a thickness in the range of 10 micrometers to 40 micrometers, and wherein the layer of carbon nanotubes exhibits a thickness in the range of 2 nanometers to 50 nanometers, the copper coating layer exhibits a thickness in the range of 0.1 micrometers to 3 micrometers, and the copper foil provides the remainder of the thickness of the first copper tape.

2. The composite conductor of claim 1, wherein the conductor is formed from one or more of the following materials selected from the group consisting of copper, aluminum, and iron.

3. The composite conductor of claim 1, further comprising at least one additional carbon nanotube layer disposed on the second copper layer and at least one additional second copper layer disposed on the at least one additional carbon nanotube layer.

4. The composite conductor of claim 1, wherein at least one additional copper tape is bonded to the first copper tape bonded to the surface.

5. The composite conductor of claim 1, wherein no intermetallic phases are formed at the surface.

6. The composite conductor of claim 1, wherein a plurality of conductors are sintered together.

7. The composite conductor of claim 1, wherein the conductor is in the form of a busbar.

8. The composite conductor of claim 7, wherein the busbar is affixed to a plurality of windings of a stator.

9. The composite conductor of claim 8, wherein a rotor is rotatably held in the stator.

10. The composite conductor of claim 9, wherein the busbar is affixed to an inverter.

11. The composite conductor of claim 1, wherein the electrical conductivity of the conductor is in the range of $1.0\times10^7$ Siemens per meter (S/m) to $6.04\times10^7$ Siemens per meter at 20 degrees Celsius and the electrical conductivity of the first copper tape is in the range of $5.5\times10^7$ Siemens per meter to $6\times10^7$ Siemens per meter at 20 degrees Celsius.

12. The conductor of claim 1, wherein the carbon nanotubes of the first layer of carbon nanotubes are doped with copper at a level in the range of 0.1 volume percent to 50 volume percent of the total volume percent of the carbon nanotubes.

13. A propulsion system for a vehicle, comprising:

an electric motor, the electric motor including a stator including a plurality of windings;

a rotor arranged within the stator; and a composite busbar connected to the plurality of windings, the composite busbar including a busbar including a surface, the busbar formed of at least one material selected from a group consisting of copper, aluminum, and iron, and a first copper tape laminated to the surface, wherein the first copper tape includes a layer of carbon nanotubes sandwiched between a first copper foil layer and a second copper coating layer, and wherein the first copper tape exhibits a thickness in the range of 10 micrometers to 40 micrometers, and wherein the carbon nanotube layer exhibits a thickness in the range of 2 nanometers to 50 nanometers, the copper coating layer exhibits a thickness in the range of 0.1 to 3 micrometers, and the copper foil provides the remainder of the thickness of the first copper tape.

14. The propulsion system of claim 13, further comprising at least one additional carbon nanotube layer disposed on the second copper coating layer and at least one additional second copper coating layer disposed on the at least one additional carbon nanotube layer.

15. The propulsion system of claim 13, wherein at least one additional copper tape is laminated to the first copper tape bonded to the surface.

16. The propulsion system of claim 13, wherein the carbon nanotubes of the first layer of carbon nanotubes are doped with copper at a level in the range of 0.1 volume percent to 50 volume percent of the total volume percent of the carbon nanotubes.

17. A method of forming a composite busbar for a vehicle, comprising:

heating a busbar and a first copper tape, wherein the first copper tape includes a layer of carbon nanotubes sandwiched between a first copper layer and a second copper layer, wherein the first copper layer is a copper foil and the second copper layer is a copper coating, and wherein the first copper tape exhibits a thickness in the range of 10 micrometers to 40 micrometers, wherein the carbon nanotube layer exhibits a thickness in the range of 2 nanometers to 50 nanometers, the copper coating layer exhibits a thickness in the range of 0.1 to 3 micrometers, and the copper foil provides the remainder of the thickness of the first copper tape;

laminating the first copper tape to the busbar by applying a force to the busbar and the first copper tape and bonding the first copper tape to a surface of the busbar; and heat treating the busbar and first copper tape.

18. The method of claim 17, wherein laminating includes thermal rolling of the first copper tape to the surface, wherein the first copper tape exhibits a first length before drawing and a second length in the range of 100 percent to less than 105 percent of the first length.

19. The method of claim 17, wherein laminating includes extrusion onto the first copper tape, wherein the first copper tape exhibits a first length before drawing and a second length in the range of 100 percent to less than 105 percent of the first length.

20. The method of claim 17, wherein laminating includes hot-isostatic-pressing of the first copper tape to the surface of the busbar.

* * * * *